Patented June 1, 1954

2,680,111

UNITED STATES PATENT OFFICE 2,680,111

SYNTHETIC RUBBER EMULSION POLYMERIZATIONS

Robert W. Brown, Naugatuck, Conn., assignor to United States Rubber Company, New York, N. Y., a corporation of New Jersey No Drawing. Application March 15, 1951, Serial No. 215,871

10 Claims. (Cl. 260—84.7)

This invention relates to improvements in synthetic rubber emulsion polymerizations.

Aqueous emulsion polymerizations of mixtures of butadiene-1,3 and styrene (GR-S polymerizations) on ammonium soap emulsifiers in conventional peroxide catalyzed recipes are too slow to be of any practical importance (see White U. S. Patent 2,393,133). Ammonia is also known to strongly inhibit polymerization of conventional peroxide catalyzed GR-S recipes. The desirability of using ammonium soaps as emulsifiers for the monomers in GR-S polymerization to give synthetic rubbers having improved water-resistance and electrical properties has been recognized even though successful recipes to give high conversion rates comparable to those with alkali-metal soap emulsifiers have not been found.

I have discovered that ammonium soaps can be used as emulsifiers to give high conversion rates in certain synthetic rubber aqueous polymerizations if the polymerization takes place in a polyalkylene polyamine activated organic peroxide catalyzed system (so-called peroxyamine polymerization) and if there is also present ammonia in excess of that necessary to neutralize the soap-forming acid.

In carrying out the invention, the synthetic rubber-producing monomers are polymerized at temperatures from +20° C. to 0° C. (so-called low temperature but above freezing conditions) in aqueous emulsion containing ammonium soap, organic peroxide catalyst, polyalkylene polyamine activator, and free ammonia in excess of that to neutralize soap-forming acids, and the polymerization is allowed to continue until the desired conversion of monomers to synthetic rubber, generally 45 to 95% conversion, is reached. After conversion of the desired amount of polymerizable monomers to synthetic rubber, the polymerization is stopped by the addition of a so-called shortstopping agent (e. g. di-tert.-butyl-hydroquinone, dinitrochlorobenzene, sodium dimethyl dithiocarbamate, dimethylammonium dimethyl dithiocarbamate) and the unreacted residual polymerizable monomers are removed from the synthetic rubber latex. Those which are gaseous at atmospheric pressure and at the temperature of polymerization or the temperature to which the synthetic rubber latex is allowed to rise after polymerization, may be vented off. Residual higher boiling or liquid monomers at room temperature are removed by steam distilling under reduced pressure. If desired, the synthetic rubber latex may be coagulated by salt and/or acid in known manner.

The polymerizable material in the preparation of the synthetic rubber latex may be one or a mixture of butadienes-1,3 hydrocarbons, for example, butadiene-1,3 methyl-2-butadiene-1,3 (isoprene), piperylene, 2,3-dimethyl butadiene-1,3, or may be a mixture of one or more such butadiene-1,3 hydrocarbons with up to 70% by weight of the mixture of one or more aryl olefines or chloro-substituted aryl olefines, e. g. styrene, vinyl naphthylene, alpha methyl styrene, parachloro styrene, dichloro styrenes.

The catalyst is a conventional organic hydroperoxide catalyst, for example, alpha, alpha-dimethyl benzyl hydroperoxide or so-called cumene hydroperoxide, dodecyl cumene hydroperoxide, chlorocumene hydroperoxide, tert.butyl cumene hydroperoxide, di-isopropyl benzene hydroperoxide, tri-isopropyl benzene hydroperoxide, tert. amyl hydroperoxide, cyclohexyl benzene hydroperoxide, menthane hydroperoxide, and the amount or organic peroxide catalyst will generally be from 0.05 to 2 parts per 100 parts of polymerizable monomers. All parts and percentages referred to herein are by weight.

The polyalkylene polyamine activators for the organic peroxide catalyst are well known materials and may be one or a mixture of polyalkylene polyamines. Effective activators are diethylene triamine, dipropylene triamine, triethylene tetramine, tripropylene tetramine, tetraethylene pentamine, pentaethylene hexamine, hexaethylene heptamine, heptaethylene octamine, and higher polyethylene polyamines up to mixtures of high molecular weight polyethylene polyamines having an average molecular weight of over a thousand, as in the still bottom from the distillation recovery of the lower polyethylene polyamines (and ethylene diamine) from the autoclave reaction product of ethylene dichloride and ammonia, which has a molecular weight around 1200. The amount of polyalkylene polyamine will generally be from 0.05 to 1 part per 100 parts of polymerizable monomers.

The ammonium soaps used as emulsifying agents are the ammonium soaps of one or of a mixture of conventional soap-forming monocarboxylic acids having 10 to 20 carbon atoms in the molecule, viz. higher fatty acids or rosin acids (abietic, hydroabietic, and dehydroabietic acids), or mixtures of the same. The amount of ammonium soap emulsifier generally will be 1 to 8 parts per 100 parts of polymerizable monomers and may be all incorporated at the start of the polymerization or may be added in movements to give a larger particle size latex. Polyalkylene polyamine activation of organic peroxide catalyzed GR–S polymerizations in the presence of alkali-metal soap and excess alkali-metal hydroxide is known ("Polyamine-Activated Polymerizations" by G. S. Whitby et al., Ind. Eng. Chem., 42, 445–456).

The amount of free ammonia over that necessary to neutralize the soap-forming acids need only be a small amount. As shown in Examples I and II below, as little as 0.04 part excess ammonia per part of completely neutralized ammonium soap will give a rapid conversion of monomers that is unobtainable without excess ammonia. Higher amounts of ammonia, for example, up to 5 parts or more excess ammonia per part of completely neutralized ammonium soap, may be used.

The following examples illustrate the invention:

*Example I*

The following recipe was loaded into a series of polymerization bottles:

|  | Parts |
| --- | --- |
| Butadiene | 71 |
| Styrene | 29 |
| Diisopropyl benzene monohydroperoxide | 0.15 |
| Tetraethylene pentamine | 0.15 |
| Soap (ammonium laurate) | 5.0 |
| Ammonium acetate | 0.7 |
| Water | 180 |

The ammonium acetate was added to reduce the viscosity. In one of the bottles no excess ammonia over that used to completely neutralize the lauric acid was added. In five other bottles amounts of ammonia from 0.05 to 0.40 part in excess of the ammonia used to neutralize the lauric acid in forming the five parts of ammonium laurate soap were added to the emulsion of polymerizable monomers. The bottles were rotated end over end in a constant temperature bath at 5° C. for 13 hours, after which the polymerization was stopped by the addition of 0.15 part of dimethylammonium dimethyl dicarbamate.

Excess butadiene was allowed to vent off, and the percent conversion of monomers to polymer was determined by evaporation of the weighed sample of the latex. The conversion of the various polymerizations is shown in the following table:

| Parts Excess Ammonia per 5 parts of Soap | 0.00 | 0.05 | 0.15 | 0.20 | 0.30 | 0.40 |
| --- | --- | --- | --- | --- | --- | --- |
| Percent Conversion | 33 | 40 | 86 | 90 | 90 | 93 |

A second series of polymerization recipes of the above formulation was loaded into polymerization bottles. The soap in this case was a completely neutralized ammonium soap of mixed fatty acids (mainly stearic with some palmitic and oleic acids). In one polymerization bottle no excess ammonia over that used to neutralize the mixed fatty acids was added. In the other polymerization bottles, amounts of excess ammonia from 0.05 to 1.5 parts over that used to neutralize the mixed fatty acids was added to the polymerization bottles. The bottles were rotated end over end in a constant temperature bath at 5° C. for 13 hours, after which 0.15 part of dimethyl ammonium dimethyl dithiocarbamate shortstopping agent was added. Excess butadiene was allowed to vent off and the percent conversion of monomers to polymer was determined by evaporation of a weighed sample of the latex. The conversion of the various polymerizations is shown in the following table:

| Parts Excess Ammonia per 5 parts of Soap | 0.00 | 0.05 | 0.10 | 0.30 | 1.0 | 1.5 |
| --- | --- | --- | --- | --- | --- | --- |
| Percent Conversion | 12 | 25 | 26 | 46 | 50 | 57 |

As shown above, small excess amounts of ammonia effectively increased the polymerization rate, whereas completely neutralized soap without excess ammonia, give unsatisfactory polymerizations.

*Example II*

Much larger amounts of excess ammonia, may be used in the present invention, as shown below. The following recipe was loaded into a series of polymerization bottles:

|  | Parts |
| --- | --- |
| Butadiene | 71 |
| Styrene | 29 |
| Diisopropyl benzene hydroperoxide | 0.15 |
| Tetraethylene pentamine | 0.15 |
| Soap (ammonium laurate) | 5.0 |
| Potassium chloride | 0.2 |
| Water + ammonia | 180 |

The soap was completely neutralized ammonium laurate soap. Potassium chloride was added to reduce the viscosity of the latex. In one polymerization bottle no excess ammonia was added. In four other polymerization bottles excess ammonia from 1.4 to 22 parts over that necessary to neutralize the lauric acid in forming the 5 parts of ammonium laurate soap was added. The bottles were rotated end over end at a constant temperature bath at 5° C. for 12 hours, after which 0.2 part of sodium dimethyl dithiocarbamate shortstopping agent was added. Excess butadiene was allowed to vent off and the percent conversion of monomers to polymer was determined by evaporation of a weighed sample of the latex. The conversion of the various polymerizations is shown in the following table:

| Parts Excess Ammonia | 0.00 | 1.4 | 5.6 | 17 | 22 |
| --- | --- | --- | --- | --- | --- |
| Percent Conversion | 40 | 100 | 92 | 98 | 93 |

*Example III*

The following recipe was loaded into a polymerization bottle:

|  | Parts |
| --- | --- |
| Butadiene | 71 |
| Styrene | 29 |
| Ammonium salt of disproportionated rosin acids | 3.9 |
| Ammonium salt of mixed fatty acids | 0.8 |
| Diisopropyl benzene hydroperoxide | 0.20 |
| Tetraethylene pentamine | 0.20 |
| Tetrasodium salt of ethylene diamine tetraacetic acid | 0.003 |
| Ammonium carbonate | 0.3 |
| Ammonium hydroxide (28% ammonia) | 5.0 |
| Mixed tertiary mercaptans | 0.25 |
| Water | 175 |

The tetrasodium salt of ethylene diamine tetraacetic acid was used to control the high initial reaction rate and sustain polymerizaion. The mixed tertiary mercaptans are conventional regulators. The polymerization bottles were rotated end over end at 5° C. for 18 hours, after which it was shortstopped by the addition of 0.20 part of dimethylammonium dimethyl dithiocarbamate. Analysis showed 64% conversion of monomers to polymer in this period, which is much greater than similar polymerizations without the excess ammonia.

Example IV

The following recipe was loaded into a series of polymerization bottles. The organic peroxide catalyst and the polyethylene polyamine varying with the different polymerizations:

| | Parts |
|---|---|
| Butadiene | 71 |
| Styrene | 29 |
| Organic peroxide catalyst | 0.10 |
| Polyethylene polyamine | 0.10 |
| Ammonium salt of mixed fatty acids | 5.0 |
| Ammonium hydroxide (28% ammonia) | 5.0 |
| Mixed tertiary mercaptans | 0.25 |
| Water | 175 |

The bottles were rotated end over end at 5° C. for the desired polymerization period, after which the polymerization was stopped by the addition of 0.20% of dimethylammonium dimethyl dithiocarbamate shortstopping agent, and the percent conversion of monomers to polymer was determined in the usual manner. With an eighteen hour polymerization using cumene hydroperoxide catalyst and diethylene triamine activator, the conversion was 63%. In an eighteen hour polymerization with cumene hydroperoxide catalyst and tetraethylene pentamine activator, the conversion was 61%. With a twelve hour polymerization using p-tert.-butyl cumene hydroperoxide catalyst and diethylene triamine activator, the conversion was 52%. With a twelve hour polymerization using p-tert.-butyl cumene hydroperoxide catalyst and tetraethylene pentamine activator, the conversion was 61%. All these conversions are much higher than are possible without excess ammonia over that necessary to neutralize the soap-forming acids.

The following recipe was loaded into a series of polymerization bottles:

Example V

| | Parts |
|---|---|
| Butadiene | 100 |
| Diisopropyl benzene monohydroxide | 0.15 |
| Tetraethylene pentamine | 0.15 |
| Ammonium salt of mixed fatty acids ($C_{16}$ and $C_{18}$) | 5.0 |
| Ammonium acetate | 0.7 |
| Mixed tertiary mercaptans | 0.3 |
| Water | 180 |

In one polymerization bottle no excess ammonia was added. In three other polymerization bottles excess ammonia from 0.3 to 1 part over that necessary to neutralize the mixed fatty acids in forming the 5 parts of mixed fatty acid soap was added. The bottles were rotated end over end at 5° C. for 18 hours, after which 0.2 part of dimethyl-ammonium dimethyl dithiocarbamate shortstopping agent was added. Excess butadiene was allowed to vent off and the percent conversion of monomers to polymer was determined by evaporation of a weighed sample of the latex. The conversion of the various polymerizations is shown in the following table:

| Parts Excess Ammonia | 0.00 | 0.3 | 0.5 | 1.0 |
|---|---|---|---|---|
| Percent Conversion | 11 | 48.5 | 63 | 63 |

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The process which comprises polymerizing polymerizable synthetic rubber producing monomers selected from the group consisting of butadiene-1,3 hydrocarbons and mixtures of butadiene-1,3 hydrocarbons with up to 70% of the mixtures of material of the group consisting of aryl olefines and chloro-substituted aryl olefines in an aqueous emulsion containing ammonium soap of soap-forming monocarboxylic acids as soap emulsifying agent, organic hydroperoxide catalyst, and polyalkylene polyamine activator, said emulsion containing ammonia in excess of that required to neutralize the soap-forming monocarboxylic acids.

2. A process which comprises polymerizing a mixture of a major proportion of butadiene-1,3 and a minor proportion of styrene in an aqueous emulsion containing ammonium soap of soap-forming monocarboxylic acids as soap emusifying agent, organic hydroperoxide catalyst, and polyalkylene polyamine activator, said emulsion containing excess ammonia over that required to neutralize the soap-forming monocarboxylic acids in amount from 0.04 to 5 parts per part of said ammonium soap of soap-forming monocarboxylic acid.

3. A process which comprises polymerizing polymerizable synthetic rubber producing monomers selected from the group consisting of butadiene-1,3 hydrocarbons and mixtures of butadiene-1,3 hydrocarbons with up to 70% of the mixtures of material of the group consisting of aryl olefines and chloro-substituted aryl olefines in an aqueous emulsion containing 1 to 8 parts by weight of ammonium soap of soap-forming monocarboxylic acids per 100 parts of said monomers as soap emulsifying agent, organic hydroperoxide catalyst, and polyalkylene polyamine activator, said emulsion containing excess ammonia over that required to neutralize the soap-forming monocarboxylic acids in amount from 0.04 to 5 parts per part of said ammonium soap of soap-forming monocarboxylic acid.

4. A process which comprises polymerizing a mixture of a major proportion of a butadiene-1,3 hydrocarbon and a minor proportion of an aryl olefine in an aqueous emulsion containing 1 to 8 parts by weight of ammonium soap of soap-forming monocarboxylic acids per 100 parts of butadiene and styrene mixture as soap emulsifying agent, organic hydroperoxide catalyst, and polyalkylene polyamine activator, said emulsion containing excess ammonia over that required to neutralize the soap-forming monocarboxylic acids in amount from 0.04 to 5 parts per part of said ammonium soap of soap-forming monocarboxylic acid.

5. A process which comprises polymerizing a mixture of a major proportion of butadiene-1,3 and a minor proportion of styrene in an aqueous emulsion containing 1 to 8 parts by weight of ammonium soap of soap-forming monocarboxylic acids per 100 parts of butadiene and styrene mixture as soap emulsifying agent, diisopropyl benzene hydroperoxide catalyst, and polyethylene polyamine activator, said emulsion containing excess ammonia over that required to neutralize the soap-forming monocarboxylic acids in amount from 0.04 to 5 parts per part of said ammonium soap of soap-forming monocarboxylic acid.

6. A process which comprises polymerizing a mixture of a major proportion of butadiene-1,3 and a minor proportion of styrene in an aqueous emulsion containing 1 to 8 parts by weight of ammonium soap of soap-forming monocarboxylic acids per 100 parts of butadiene and styrene mixture as soap emulsifying agent, alpha, alpha-dimethyl benzyl hydroperoxide catalyst, and polyethylene polyamine activator, said emulsion containing excess ammonia over that required to neutralize the soap-forming monocarboxylic acids in amount from 0.04 to 5 parts per part of said ammonium soap of soap-forming monocarboxylic acid.

7. A process which comprises polymerizing a mixture of a major proportion of butadiene-1,3 and a minor proportion of styrene in an aqueous emulsion containing 1 to 8 parts by weight of ammonium soap of soap-forming monocarboxylic acids per 100 parts of butadiene and styrene mixture as soap emulsifying agent, p-tert.butyl alpha, alpha-dimethyl benzyl hydroperoxide catalyst, and polyethylene polyamine activator, said emulsion containing excess ammonia over that required to neutralize the soap-forming monocarboxylic acids in amount from 0.04 to 5 parts per part of said ammonium soap of soap-forming monocarboxylic acid.

8. A process which comprises polymerizing a mixture of a major proportion of butadiene-1,3 and a minor proportion of styrene in an aqueous emulsion containing 1 to 8 parts by weight of ammonium soap of soap-forming monocarboxylic acids per 100 parts of butadiene and styrene mixture as soap emulsifying agent, diisopropyl benzene hydroperoxide catalyst, and tetraethylene pentamine activator, said emulsion containing excess ammonia over that required to neutralize the soap-forming monocarboxylic acids in amount from 0.04 to 5 parts per part of said ammonium soap of soap-forming monocarboxylic acid.

9. A process which comprises polymerizing a mixture of a major proportion of butadiene-1,3 and a minor proportion of styrene in an aqueous emulsion containing 1 to 8 parts by weight of ammonium soap of soap-forming monocarboxylic acids per 100 parts of butadiene and styrene mixture as soap emulsifying agent, alpha, alpha-dimethyl benzyl hydroperoxide catalyst, and tetraethylene pentamine activator, said emulsion containing excess ammonia over that required to neutralize the soap-forming monocarboxylic acids in amount from 0.04 to 5 parts per part of said ammonium soap of soap-forming monocarboxylic acid.

10. A process which comprises polymerizing a mixture of a major proportion of butadiene-1,3 and a minor proportion of styrene in an aqueous emulsion containing 1 to 8 parts by weight of ammonium soap of soap-forming monocarboxylic acids per 100 parts of butadiene and styrene mixture as soap emulsifying agent, p-tert.butyl alpha, alpha-dimethyl benzyl hydroperoxide catalyst, and tetraethylene pentamine activator, said emulsion containing excess ammonia over that required to neutralize the soap-forming monocarboxylic acids in amount from 0.04 to 5 parts per part of said ammonium soap of soap-forming monocarboxylic acid.

References Cited in the file of this patent

UNITED STATES PATENTS

| Number | Name | Date |
|---|---|---|
| 2,560,741 | Provost | July 17, 1951 |

OTHER REFERENCES

Whitby et al., Ind. and Eng. Chem., vol. 42, No. 5, March 1950, pp. 445–456.